(12) United States Patent
Varnas et al.

(10) Patent No.: US 7,862,171 B2
(45) Date of Patent: Jan. 4, 2011

(54) OPHTHALMIC LENS ELEMENT FOR MYOPIA CORRECTION

(75) Inventors: Saulius Raymond Varnas, Brighton (AU); Scott Warren Fisher, Flagstaff Hill (AU); Ray Steven Spratt, Petaluma, CA (US)

(73) Assignee: Carl Zeiss Vision Australia Holdings Limited, Lonsdale (AU)

( * ) Notice: Subject to any disclaimer, the term of this patent is extended or adjusted under 35 U.S.C. 154(b) by 215 days.

(21) Appl. No.: 12/083,227

(22) PCT Filed: Oct. 12, 2006

(86) PCT No.: PCT/AU2006/001505

§ 371 (c)(1),
(2), (4) Date: Jun. 12, 2008

(87) PCT Pub. No.: WO2007/041796

PCT Pub. Date: Apr. 19, 2007

(65) Prior Publication Data

US 2009/0257026 A1     Oct. 15, 2009

(30) Foreign Application Priority Data

Oct. 12, 2005   (AU)   ............... 2005905621
Nov. 7, 2005    (AU)   ............... 2005906150

(51) Int. Cl.
*A61B 3/14*       (2006.01)
*G02C 7/04*       (2006.01)

(52) U.S. Cl. ...................... 351/209; 351/161
(58) Field of Classification Search ......... 351/200–246, 351/161–168, 177
See application file for complete search history.

(56) References Cited

U.S. PATENT DOCUMENTS

| 1,955,047 A | 12/1931 | Beach ............... 351/171 |
| 4,525,043 A * | 6/1985 | Bronstein ............ 351/160 R |
| 4,976,534 A * | 12/1990 | Miege et al. ........... 351/161 |
| 5,300,117 A | 4/1994 | Baikoff et al. |
| 5,349,395 A * | 9/1994 | Stoyan ................. 351/161 |
| 5,526,071 A | 6/1996 | Seidner et al. ........... 351/161 |

(Continued)

FOREIGN PATENT DOCUMENTS

AU      81216/87       5/1988

(Continued)

OTHER PUBLICATIONS

International Search Report.

(Continued)

*Primary Examiner*—Mohammed Hasan
(74) *Attorney, Agent, or Firm*—Buchanan Ingersoll & Rooney PC

(57) ABSTRACT

An ophthalmic lens element (100) for correcting myopia in a wearer's eye is disclosed. The lens element (100) includes a central zone (102) and a peripheral zone (104). The central zone (102) provides a first optical correction for substantially correcting myopia associated with the foveal region of the wearer's eye. The peripheral zone (104) surrounds the central zone (102) and provides a second optical correction for substantially correcting myopia or hyperopia associated with a peripheral region of the retina of the wearer's eye. A system and method for dispensing or designing an ophthalmic lens element for correcting myopia in a wearer's eye is also disclosed.

40 Claims, 14 Drawing Sheets

U.S. PATENT DOCUMENTS

| | | | | |
|---|---|---|---|---|
| 5,695,509 | A * | 12/1997 | El Hage | 606/166 |
| 6,752,499 | B2 | 6/2004 | Aller | |
| 7,597,442 | B2 * | 10/2009 | Biver et al. | 351/177 |
| 2003/0107707 | A1 | 6/2003 | Fisher et al. | |
| 2005/0105047 | A1 | 5/2005 | Smitth, III et al. | |
| 2007/0103641 | A1 | 5/2007 | Bonnin | 351/209 |

FOREIGN PATENT DOCUMENTS

| | | |
|---|---|---|
| AU | 74160/91 | 10/1991 |
| AU | 50581/93 | 5/1994 |
| AU | 50582/93 | 5/1994 |
| EP | 0 453 159 | 10/1991 |
| FR | 2 863 857 A1 | 6/2005 |
| WO | WO 96/16621 A1 | 6/1996 |
| WO | WO 2007036626 | 4/2007 |

OTHER PUBLICATIONS

Mutti et al., "Peripheral Refraction and Ocular Shape in Children" Investigative Ophthalmology & Visual Science, 2000, vol. 41, No. 5, pp. 1022-1030, Oct 26, 1999.

Smith et al., "Keynote Address: Animal Models and Human Refractive Errors" 10th International Myopia Conference 2004, pp. 15 and 18, Oct. 4, 2004.

Stone et al., "Ocular Shape and Myopia" Annals Academy of Medicine, 2004, vol. 33, No. 1, pp. 7-15.

Atchison et al., "Peripheral refraction along the horizontal and vertical visual fields in myopia", Vision Research, 2006, pp. 1450-1458, Apr. 7, 2005.

Austrian Patent Office Written Opinion mailed Jul. 23, 2009 (cited references previously filed in Information Disclosure Statement on Apr. 8, 2008).

Chinese Office Action mailed Nov. 20, 2009 (cited reference previously filed in Information Disclosure Statement on Apr. 8, 2008).

Lundström et al., "Assessment of Objective and Subjective Eccentric Refraction", Optometry and Vision Science, vol. 82, No. 4, Apr. 2005, pp. 298-306, American Academy of Optometry.

Wallman et al., "Homeostasis of Eye Growth and the Question of Myopia", Department of Biology, City College of the City University of New York, Neuron, vol. 43, Aug. 19, 2004, pp. 447-468, Cell Press.

Afanador et al., "Eye and Head Contribution to Gaze at Near through Multifocals: The Usable Field of View", American Journal of Optometry & Physiological Office, 1986, vol. 63, No. 3, pp. 187-192, American Academy of Optometry.

Williams et al., "Off-axis Optical Quality and Retinal Sampling in the Human Eye", Vision Res., vol. 36, No. 8, pp. 1103-1114, 1996, Elsevier Science Ltd.

Supplementary European Search Report dated Aug. 23, 2010 in corresponding European Patent Application No. 06790375.7.

* cited by examiner

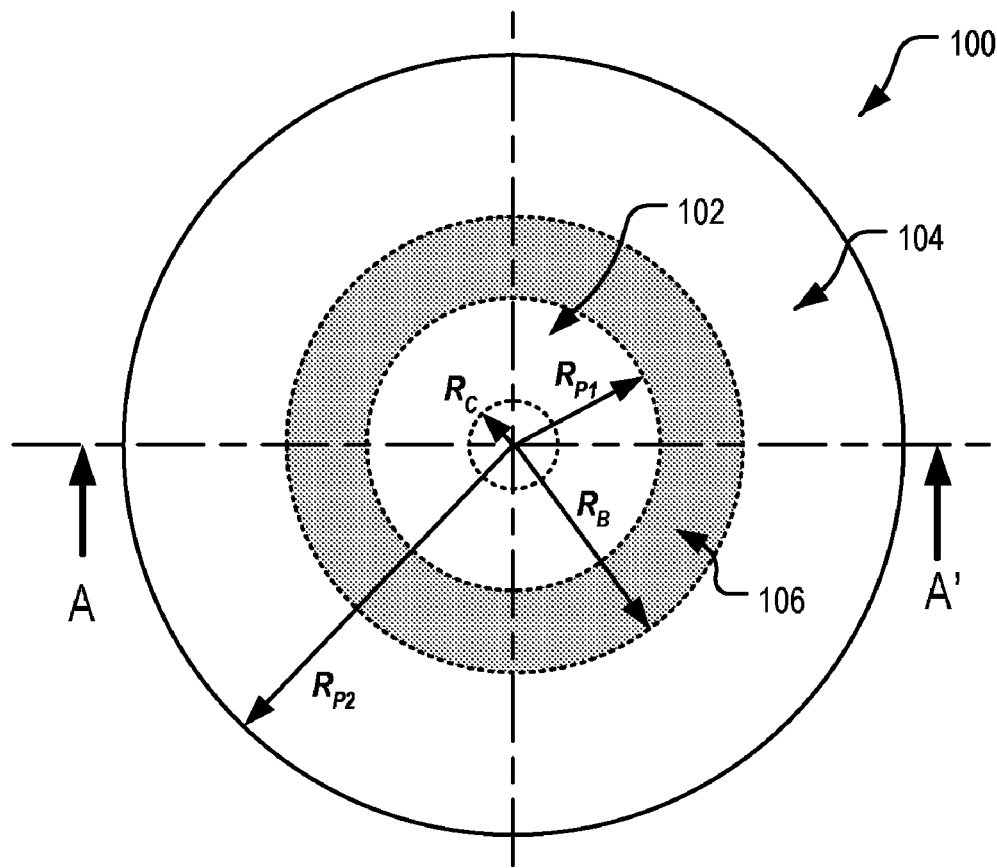
FIG. 1-A
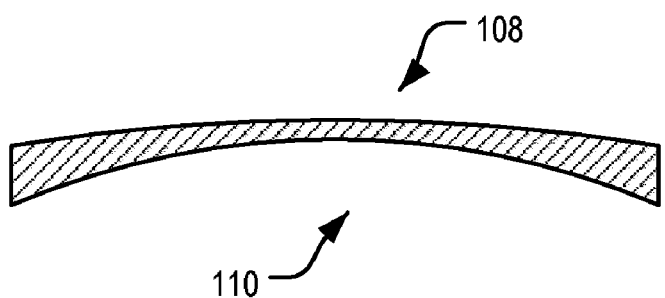
SECTION A-A'
FIG. 1-B

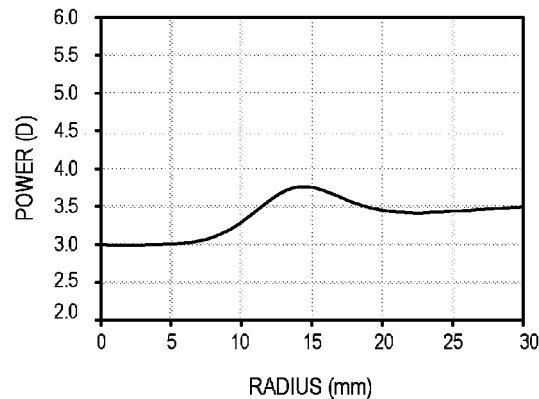
FIG. 2-A
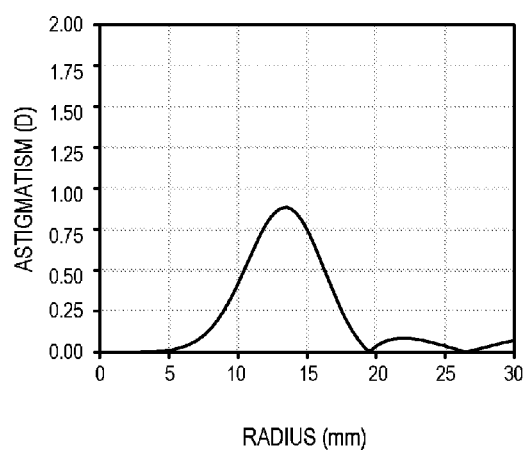
FIG. 2-B
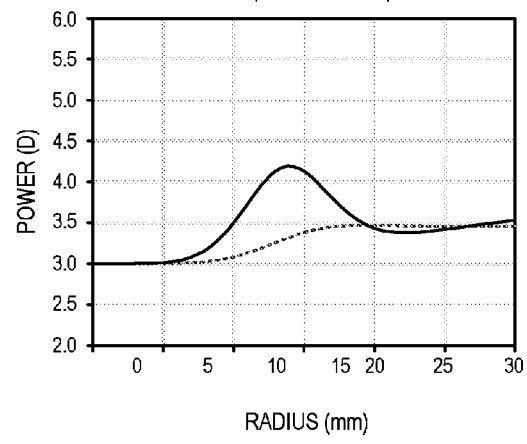
FIG. 2-C

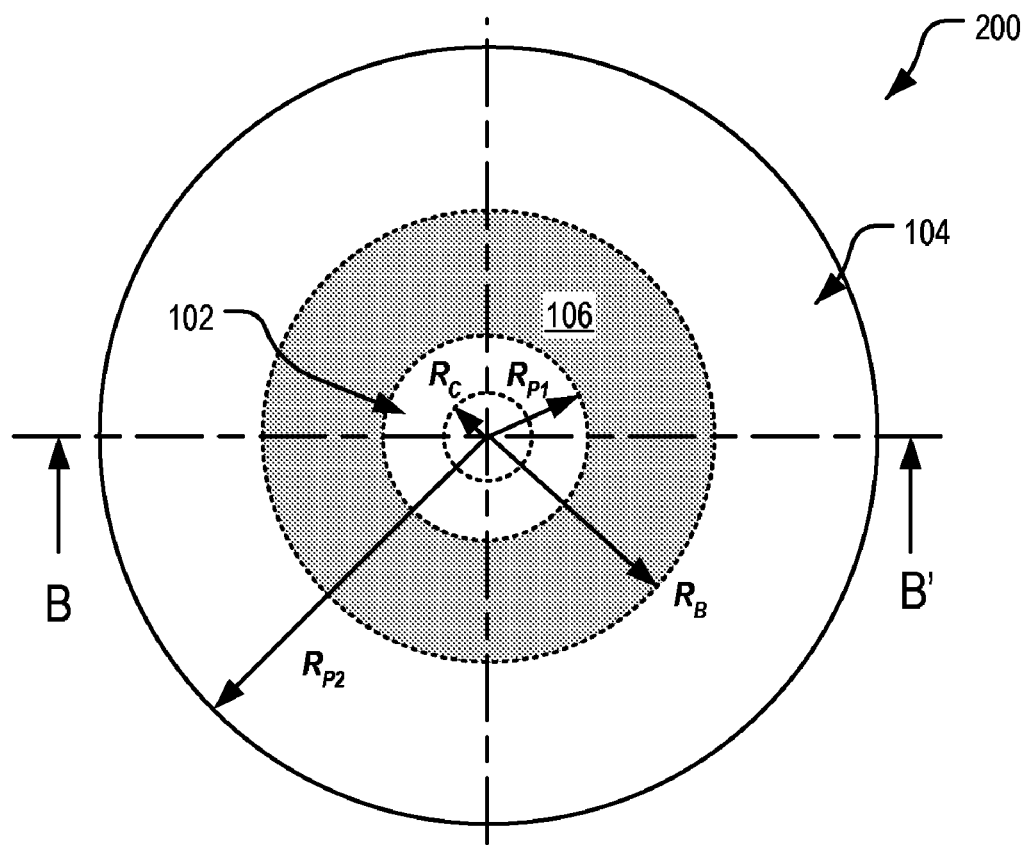
FIG. 3-A
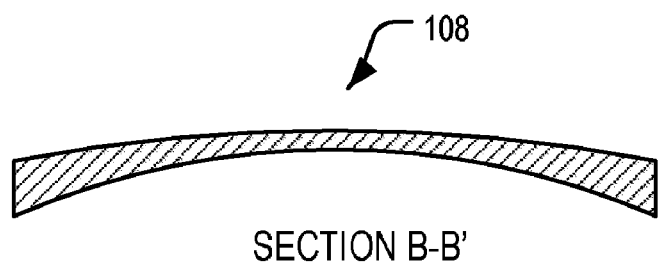
SECTION B-B'
FIG. 3-B

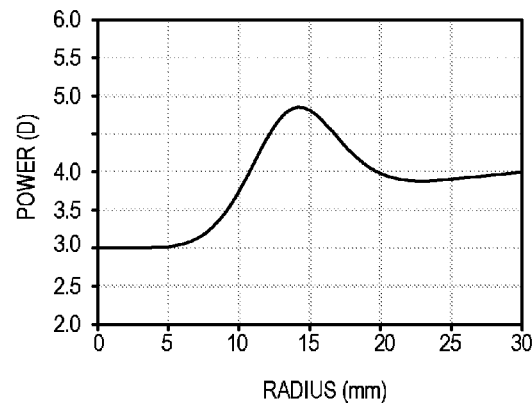
FIG. 4-A
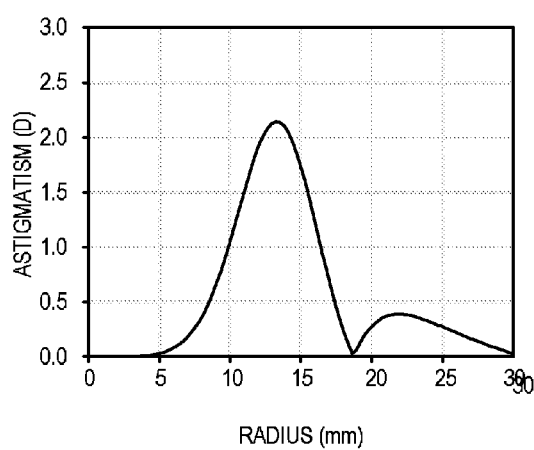
FIG. 4-B
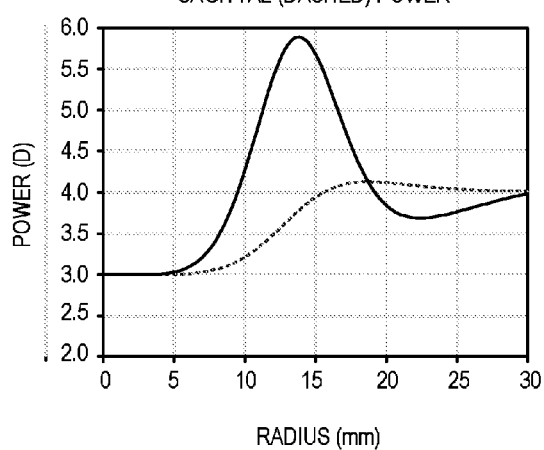
FIG. 4-C

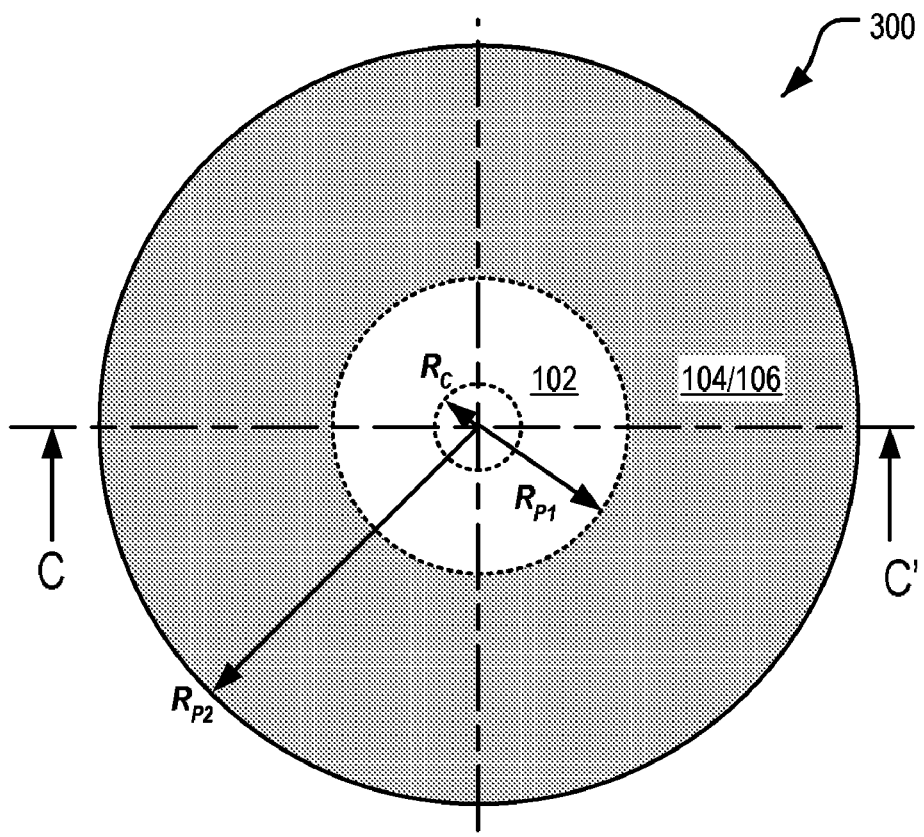
FIG. 5-A
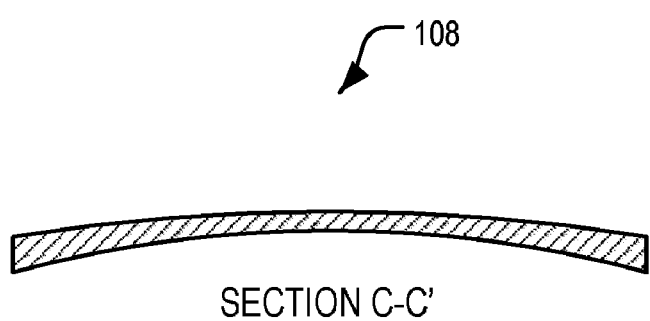
SECTION C-C'
FIG. 5-B

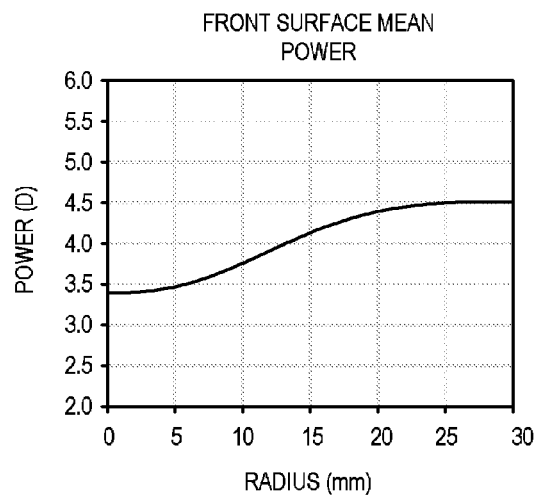
FIG. 6-A
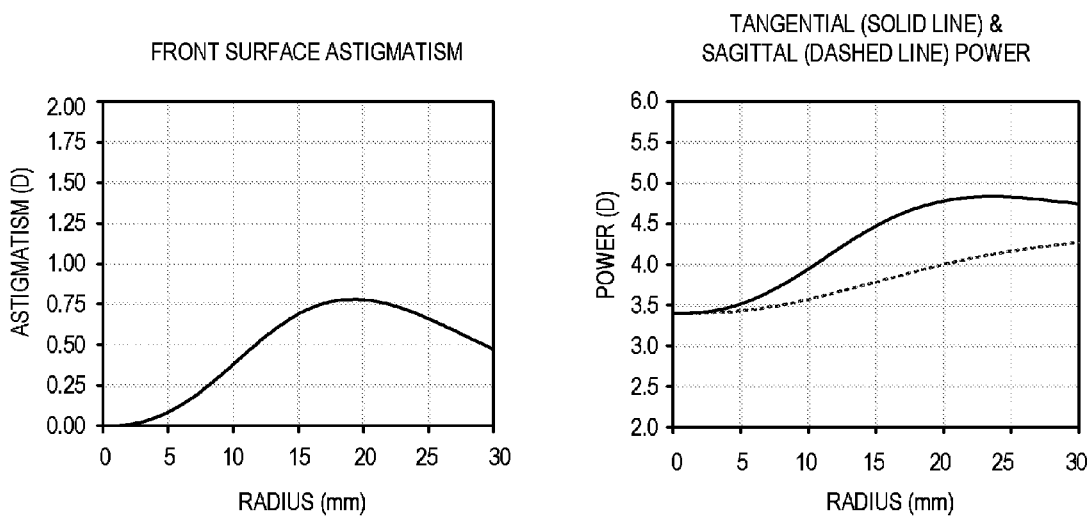
FIG. 6-B
FIG. 6-C

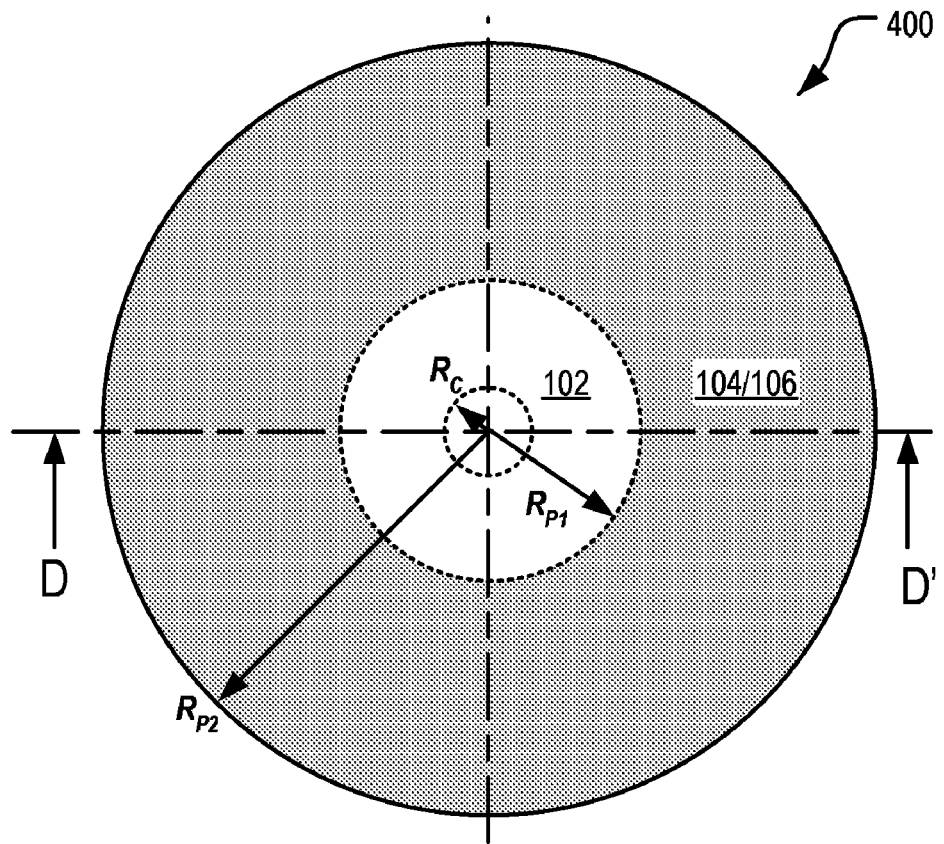
FIG. 7-A
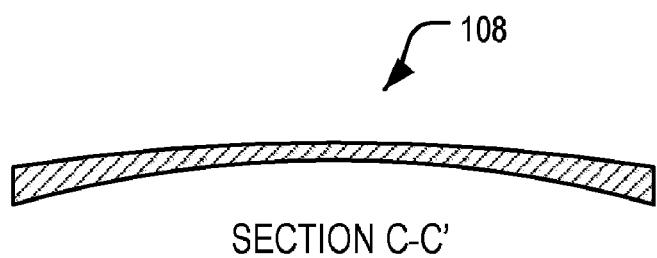
SECTION C-C'
FIG. 7-B

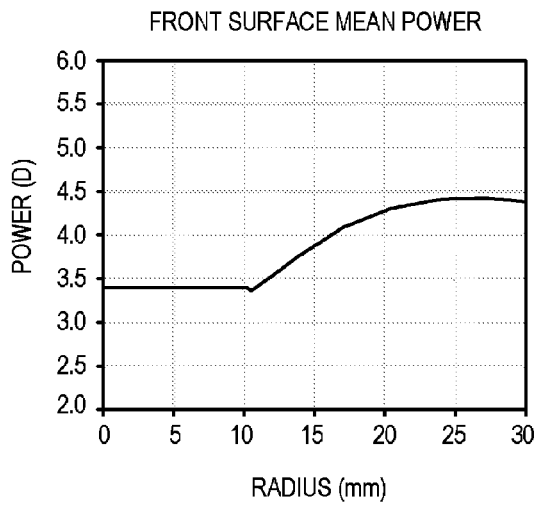
FIG. 8-A
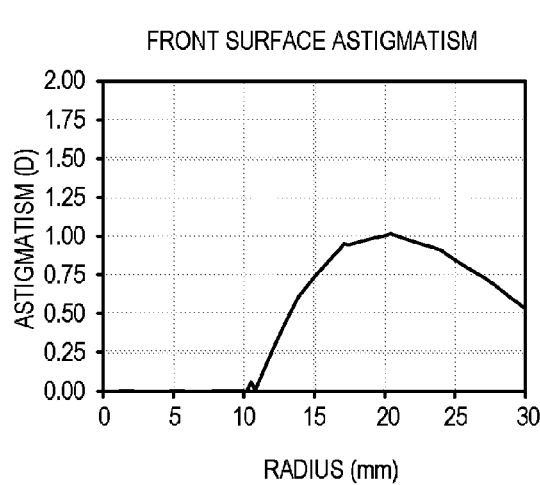
FIG. 8-B
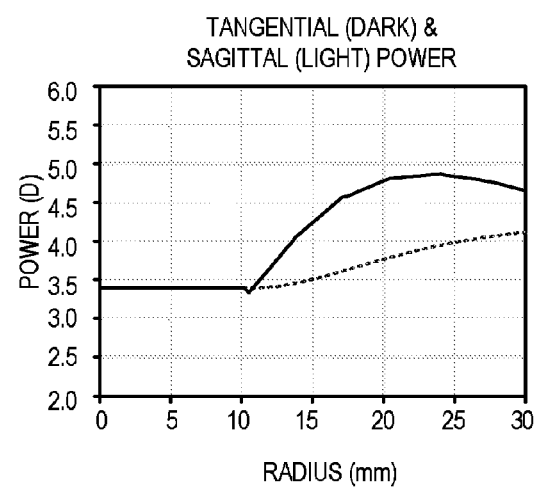
FIG. 8-C

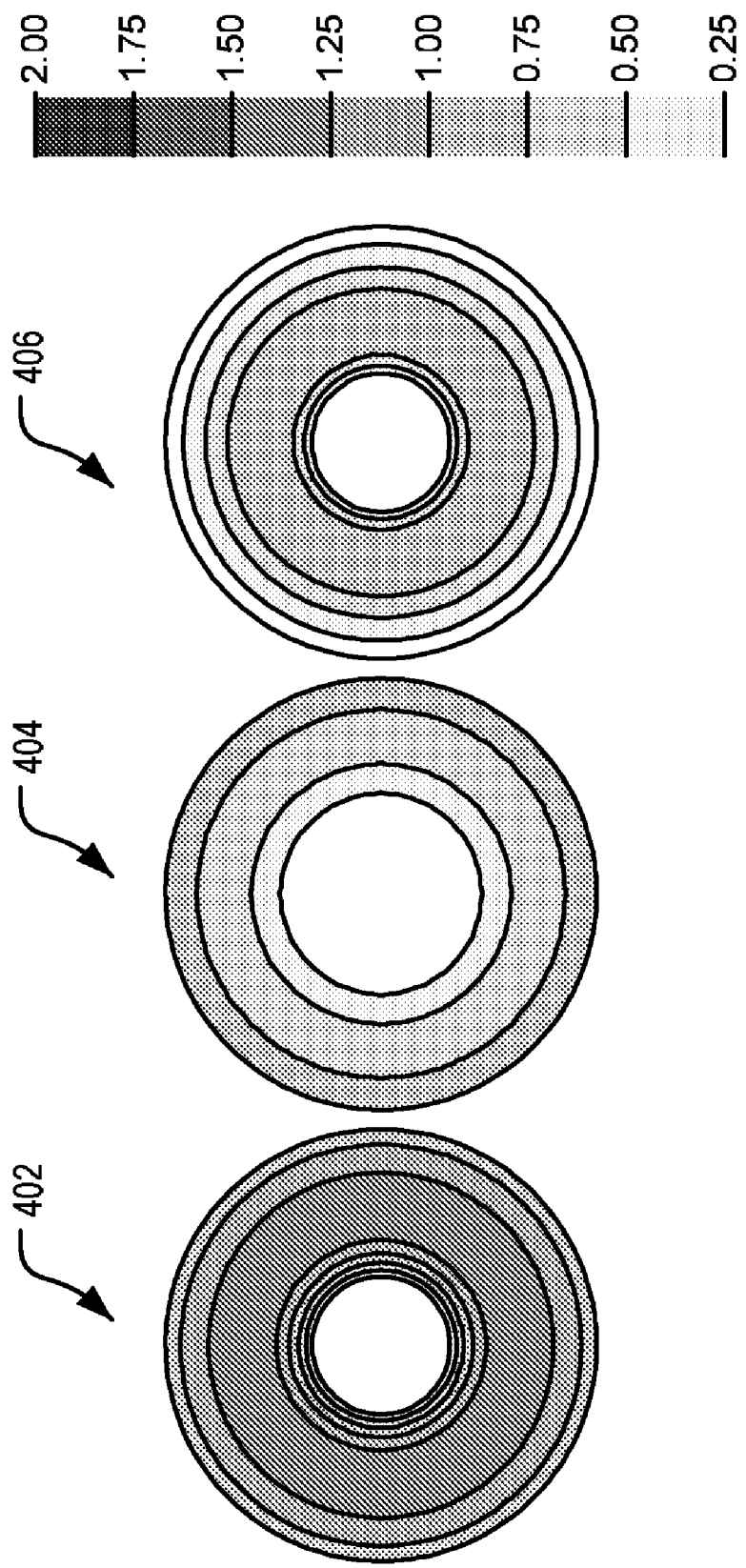
FIG. 8-D

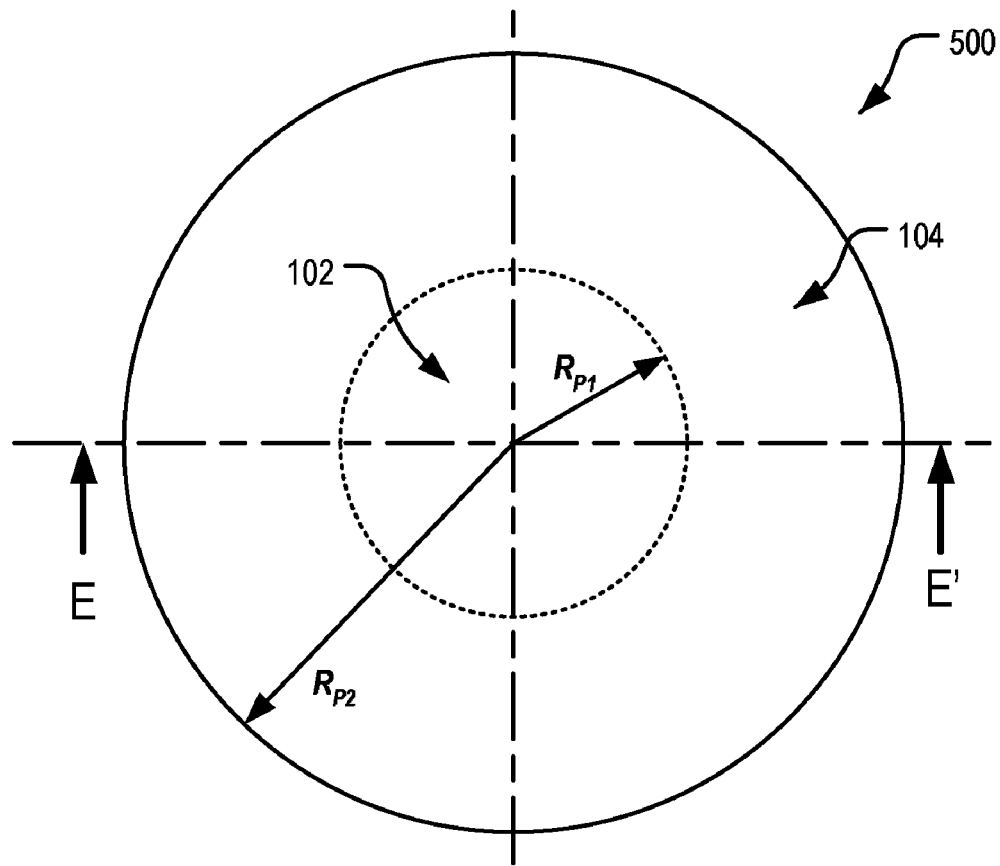
FIG. 9-A
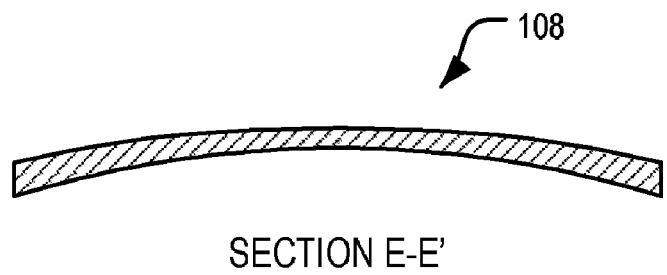
SECTION E-E'
FIG. 9-B

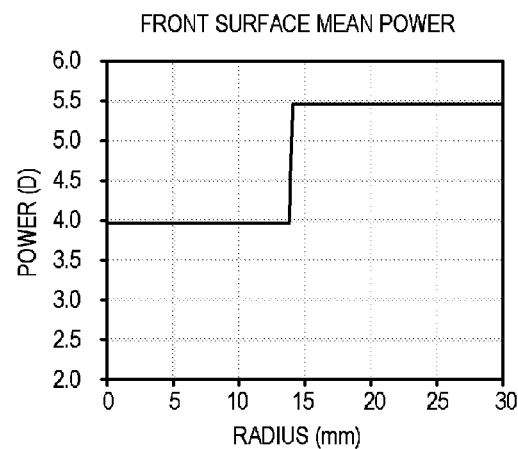
FIG. 10-A
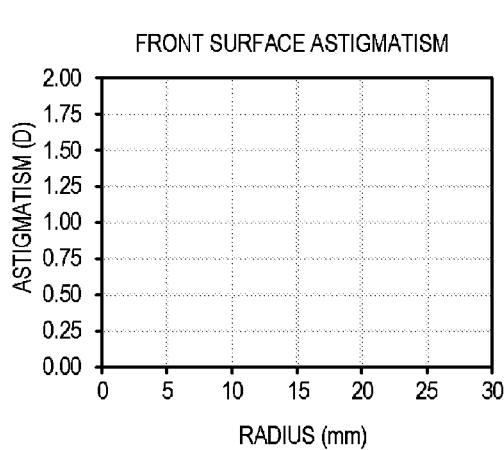
FIG. 10-B
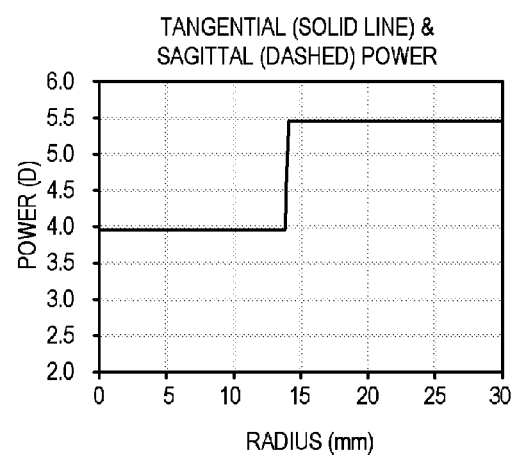
FIG. 10-C

OPHTHALMIC LENS ELEMENT FOR MYOPIA CORRECTION

This application claims priority from Australian Provisional Patent Application No. 2005905621 filed on 12 Oct. 2005 and Australian Provisional Patent Application No. 2005906150 filed on 7 Nov. 2005, the contents of each of which are to be taken as incorporated herein by this reference.

FIELD OF INVENTION

The present invention relates to ophthalmic lens elements for correcting myopia, and methods of designing such lens elements.

BACKGROUND OF THE INVENTION

To provide focussed vision, an eye must be capable of focusing light on the retina. However, an eye's ability to focus light on the retina largely depends on the shape of the eyeball. If an eyeball is "too long" relative to its "on-axis" focal length (meaning, the focal length along the optical axis of the eye), or if the outside surface (that is, the cornea) of the eye is too curved, the eye will be unable to properly focus distant objects on the retina. Similarly, an eyeball that is "too short" relative to its on-axis focal length, or that has an outside surface which is too flat, will be unable to properly focus near objects on the retina.

An eye that focuses distant objects in front of the retina is referred to as a myopic eye. The resultant condition is referred to as myopia, and is usually correctable with appropriate single-vision lenses. When fitted to a wearer, conventional single-vision lenses correct myopia associated with central vision. Meaning that, conventional single-vision lenses correct myopia associated with vision that uses the fovea and parafovea. Central vision is often referred to as foveal vision.

Although conventional single-vision lenses correct myopia associated with central vision, recent research has shown (reviewed in R. A. Stone & D. L. Flitcroft 'Ocular Shape and Myopia' (2004) 33(1) *Annals Academy of Medicine* 7) that off-axis focal length properties of the eye often differ from the axial and paraxial focal lengths. In particular, myopic eyes tend to display less myopia in the retina's peripheral region as compared with its foveal region. This difference may be due to a myopic eye having a prolate vitreous chamber shape.

Indeed, a recent United States study (Mutti, D. O., Sholtz, R. I., Friedman and N. E., Zadnik, K., 'Peripheral refraction and ocular shape in children', (2000) 41 *Invest. Opthalmol. Vis. Sci.* 1022) observed that the mean (±standard deviation) relative peripheral refractions in myopic eyes of children produced+0.80±1.29 D of spherical equivalent.

Interestingly, studies with chicks and monkeys have indicated that a defocus in peripheral retina alone, with the fovea staying clear, can cause an elongation of the foveal region (Josh Wallman and Earl Smith 'Independent reports to 10th International Myopia Conference' (2004) Cambridge, UK) and the consequent myopia.

Unfortunately, conventional myopia correcting lenses haphazardly produce clear or defocused images in the retina's peripheral region. Thus, existing ophthalmic lenses for correcting myopia may fail to remove stimuli for myopia progression.

The discussion of the background to the invention herein is included to explain the context of the invention. This is not to be taken as an admission that any of the material referred to was published, known or part of the common general knowledge as at the priority date of any of the claims.

SUMMARY OF THE INVENTION

The present invention provides an ophthalmic lens element that simultaneously improves focussing in the foveal region and the peripheral region of the retina of a myope's eye. Accordingly, the present invention is directed to an ophthalmic lens element that compensates for a varying focal plane of the eye so as to remove most, if not all, blur from the retina, at least for a primary viewing position. Such compensation removes a stimulus for myopic progression and thus corrects, or at least reduces the progression of, myopia.

More specifically, the present invention provides an ophthalmic lens element for correcting myopia in a wearer's eye, the lens element including:

(a) a central zone providing a first optical correction for substantially correcting myopia associated with the foveal region of the wearer's eye; and (b) a peripheral zone surrounding the central zone, the peripheral zone providing a second optical correction for substantially correcting myopia or hyperopia associated with a peripheral region of the retina of the wearer's eye.

An ophthalmic lens element according to the present invention includes a front surface (that is, the surface on the object side of the lens element) and a back surface (that is, the surface nearest the eye). The front and back surfaces are shaped and arranged to provide the respective optical corrections. In other words, the front and back surfaces are shaped and arranged to provide a refracting power for the central zone and the peripheral zone respectively.

In this specification, the refracting power provided by the central zone will be referred to as "the central zone power", whereas the refracting power provided by the peripheral zone will be referred to as "the peripheral zone power". The central zone refracting power substantially corrects myopia associated with foveal region, whereas the peripheral zone refracting power substantially corrects myopia (or hyperopia) associated with the peripheral region.

In one embodiment the central zone may have a plano refracting power. Such an embodiment is expected to find application for wearer's who have not yet developed myopia, but still require an optical correction in the peripheral regional of the retina (for example, a hyperopic correction).

The front surface and the back surface may have any suitable shape. In one embodiment, the front surface is an aspherical surface and the rear surface is spherical or toric.

In another embodiment, the front surface is a spherical surface and the rear surface is aspherical or atoric.

In yet another embodiment, both the front surface and the rear surface are aspherical or atoric. In such an embodiment, the front or back surfaces may be formed by combining any suitable combination of surface shapes. For example, a front (or back) aspherical or atorical surface may be formed by combining two ellipsoidal surfaces of different curvatures.

In yet another embodiment, the front surface is a segmented bi-focal surface and the rear surface is a spherical or toric surface. In such an embodiment, the front surface may include, in the central zone, a round centred spherical segment of lower surface power than the front surface power of the peripheral zone.

The central zone power and the peripheral zone power correspond with different optical correction requirements of the wearer. The central zone power will typically correspond with the on-axial, or paraxial, optical correction required by the wearer, whereas, the peripheral zone power will typically correspond with an off-axis optical correction required by the wearer. In this respect, when we refer to the "off-axis optical correction" required by the wearer, we mean an optical correction that corrects focussing in the peripheral region of the retina, for a viewing position at which the optical axis of the eye substantially aligns with the optical axis of the ophthalmic lens.

The required optical corrections may be specified in terms of a first refracting power and a second refracting power. In this description, the term "first refracting power" refers to the optical correction (typically, the on-axis or paraxial optical correction) specified for the central zone, whereas the term "second refracting power" refers to the optical correction (typically, the off-axis optical correction) specified for the peripheral zone.

In an embodiment, the second refracting power is a refracting power at a radius of 20 mm from optical centre of the ophthalmic lens element, as measured on the front surface of the lens element, and inscribes the peripheral zone over an azimuthal extent of at least 270 degrees.

The required optical correction for the peripheral zone may be specified as a single value of refracting power or a set of values of refracting power.

When required the optical correction of the peripheral zone is specified as a single value, that value may represent the optical correction required for a particular angle of peripheral vision. For example, a single value of optical correction for the peripheral zone may be specified as a value of a refracting power for peripheral vision at a radius of 20 mm from the optical centre of the central zone as measured on the front surface of the lens element. Alternatively, the single value may represent a mean optical correction required for a range of angles of peripheral vision. For example, the single value of optical correction for the peripheral zone may be specified as a value of refracting power, for peripheral vision, extending over the radii between 10 mm and 30 mm from the optical centre of the central zone as measured on the front surface of the lens element.

Where specified as a set of values, each value in the set may represent an optical correction required for a respective angle of peripheral vision. When so specified, each set of values is associated with a range of angles of peripheral vision.

In an embodiment, the wearer's off-axis optical correction requirements are expressed in terms of clinical measurements that characterise the wearer's off-axis correction requirements. Any suitable technique may be used to obtain those requirements including, but not limited to, Rx data or ultrasound A-Scan data.

In one embodiment, the second refracting power provides a positive refracting power (that is, "a plus power correction") relative to the refracting power of the central zone. In such an embodiment, the second refracting power may be in the range of +0.50 D to +2.00 D relative to the refracting power of the central zone.

As will be appreciated, positive refracting power is not accommodatable, and thus may induce blur on the fovea of the retina when the eye rotates to view objects in the periphery of the original field of view. In other words, the positive refracting power may induce blur on the fovea when the wearer looks at objects away from the optical axis of the lens (in other words, off-axis objects). Accordingly, in an embodiment the central zone is shaped and sized to provide the required optical correction over a range of eye-rotations so as to provide the wearer with the ability to view objects within an angular range, by rotating the eye over the range of eye-rotations, without inducing blur on the fovea. In other words, it is preferred that the central zone is shaped and sized to provide an area of substantially uniform refracting power to support clear foveal vision (hereinafter "central vision") throughout an angular range of eye rotations.

In an embodiment, the central zone "blends" into the peripheral zone via a blended zone so that the mean refracting power varies gradually in a radially outward direction from the boundary of the central zone and into the peripheral zone. Alternatively, in another embodiment the transition between the central zone and the peripheral zone provides a stepped change in refracting power as in, for example, a segmented bi-focal lens.

The central zone may have any suitable shape and size. In an embodiment, the central zone is an aperture having a shape and size that is matched to the extent of the wearer's typical eye rotations before they engage head rotation.

The aperture may be rotationally symmetric or asymmetric depending on the frequency of eye rotations in different directions. An aperture having an asymmetric shape may be particularly suitable for a wearer having a different eye rotation pattern for different viewing directions. For example, a wearer may have a tendency to rotate their eyes (rather than move their head) when adjusting their direction of gaze to view objects located in an upper and lower region of their visual field, but move their head (rather than rotate their eyes) when adjusting their direction of gaze to view objects located in different lateral regions of their visual field. For such an example, the central zone may have a larger extent in the lower nasal direction to provide clear near vision. As will be appreciated, since different wearer's may have different eye rotation patterns for different viewing directions, different lens elements may provide differently sized and shaped central zones.

The present invention also provides a series of ophthalmic lens elements, the series including lens elements having a different peripheral aspherisations for the same base curve. In one embodiment, there is provided a series of lens elements, the series associated with a particular base curve that provides a peripheral power that provides a plus power correction, relative to the central zone, ranging from +0.50 to +2.00 D. Sets of series may also be provided so that a set provides plural series covering a range of base curves.

The present invention also provides a method of dispensing or designing an ophthalmic lens element for correcting myopia in a wearer's eye, the method including:

(a) obtaining, for the wearer:
   (i) a required value of on-axis optical correction, the on-axis optical correction for correcting myopia associated with the foveal region of the wearer's eye; and
   (ii) a required value of off-axis optical correction, the off-axis optical correction for correcting myopia, or hyperopia, associated with a peripheral region of the retina of the wearer's eye; and (b) selecting or designing an ophthalmic lens element according to the values of on-axis and off-axis correction, the ophthalmic lens element including:
   (i) a central zone providing an optical correction corresponding with the on-axis correction; and
   (ii) a peripheral zone surrounding the central zone, the peripheral zone providing an optical correction corresponding with the off-axis correction.

In one embodiment, a method according to the present invention may further include:

(a) determining the head movement and eye movement characteristics of the wearer; and (b) sizing and shaping the central zone according to the head movement and eye movement characteristics of the wearer so that central zone provides an area of substantially uniform refracting power for supporting central vision throughout an angular range of eye rotations.

The method embodiment of the present invention may be performed by a processing system including suitable computer hardware and software. Thus, the present invention also provides a system for dispensing or designing an ophthalmic lens element for correcting myopia in a wearer's eye, the system including:

(a) an input device for accepting or obtaining optical correction values for a wearer, the optical correction values including:
  (i) a required value of on-axis optical correction, the on-axis optical correction for correcting myopia associated with the foveal region of the wearer's eye; and
  (ii) a required value of off-axis optical correction, the off-axis optical correction for correcting myopia or hyperopia associated with a peripheral region of the retina of the wearer's eye; and (b) a processor for processing the wearer's optical correction values to select or design an ophthalmic lens element according to the values of on-axis and off-axis correction, the ophthalmic lens element including:
  (i) a central zone providing an optical correction corresponding with the on-axis correction; and
  (ii) a peripheral zone surrounding the central zone, the peripheral zone providing an optical correction corresponding with the off-axis correction.

In one embodiment, a system according to the present invention further includes:

(a) an input device for accepting or obtaining head movement and eye movement characteristics for the wearer; and (b) a processor for modifying the size and shape of the central zone according to the head movement and eye movement characteristics of the wearer so that central zone provides an area of substantially uniform refracting power for supporting central vision throughout an angular range of eye rotations.

It is envisaged that an ophthalmic lens of the present invention will remove, or at least reduce, a possible trigger of myopia progression. Thus, the present invention also provides a method of reducing myopia progression in a myope, the method including providing, to the myope, spectacles bearing a pair of ophthalmic lens elements, each lens element for a respective eye and including:

(a) a central zone providing an optical correction corresponding with on-axis correction for correcting myopia associated with the foveal region of a respective eye; and (b) a peripheral zone surrounding the central zone, the peripheral zone providing an optical correction for correcting myopia or hyperopia associated with the peripheral region of a respective eye.

The present invention also provides an ophthalmic lens element for correcting myopia, or retarding myopia progression, in a wearer's eye, the lens element including: a central zone providing clear foveal viewing throughout an angular range of eye rotations; and a peripheral zone surrounding the central zone, the peripheral zone providing, relative to the central zone, a plus power optical correction for substantially correcting myopia or hyperopia associated with a peripheral region of the retina of the wearer's eye. In such an embodiment, the central zone may provide a plano, or substantially plano, refracting power. An embodiment that includes a central zone having a plano refracting power is expected to find application in retarding myopia progression in juveniles who do not require an optical correction for foveal vision.

An ophthalmic lens element according to an embodiment of the present invention may be formulated from any suitable material. A polymeric material may be used. The polymeric material may be of any suitable type, for example, it may include a thermoplastic or thermoset material. A material of the diallyl glycol carbonate type, for example CR-39 (PPG Industries) may be used.

The polymeric article may be formed from cross-linkable polymeric casting compositions, for example as described in U.S. Pat. No. 4,912,155, U.S. patent application Ser. No. 07/781,392, Australian Patent Applications 50581/93, 50582/93, 81216/87, 74160/91 and European Patent Specification 453159A2, the entire disclosures of which are incorporated herein by reference.

The polymeric material may include a dye, preferably a photochromic dye, which may, for example, be added to the monomer formulation used to produce the polymeric material.

An ophthalmic lens element according to an embodiment of the present invention may further include standard additional coatings to the front or back surface, including electrochromic coatings.

The front lens surface may include an anti-reflective (AR) coating, for example of the type described in U.S. Pat. No. 5,704,692, the entire disclosure of which is incorporated herein by reference.

The front lens surface may include an abrasion resistant coating, for example, of the type described in U.S. Pat. No. 4,954,591, the entire disclosure of which is incorporated herein by reference.

The front and back surfaces may further include one or more additions conventionally used in casting compositions such as inhibitors, dyes including thermochromic and photochromic dyes, for example, as described above, polarising agents, UV stabilisers and materials capable of modifying refractive index.

GENERAL DESCRIPTION OF THE INVENTION

Before turning to a description of an embodiment of the present invention, there should be some explanation of some of the language used above and throughout the specification.

For example, the reference in this specification to the term "ophthalmic lens element" is a reference to all forms of individual refractive optical bodies employed in the ophthalmic arts including, but not limited to spectacle lenses, lens wafers for spectacle lenses and semi-finished lens blanks requiring further finishing to a particular wearer's prescription so as to form spectacle lenses.

Further, with respect to references to the term "surface astigmatism", such references are to be understood as a reference to a measure of the degree to which the curvature of the ophthalmic lens element varies among intersecting planes which are normal to the surface of the lens at a point on the surface.

Throughout this specification, references to the term "foveal region" are to be understood as a reference to a region of the retina that includes the fovea and that is bounded by the parafovea.

Throughout this specification, references to the term "peripheral region" are to be understood to as a reference to a region of the retina that is outside, and surrounds, the foveal region.

An ophthalmic lens element according of the present invention simultaneously and substantially corrects both central and peripheral vision. Correction of this type is expected to remove, or at least delay, a presumed trigger of myopia progression in myopes, particularly in myopic juveniles.

Many myopic eyes appear to be of approximately prolate shape. This implies that an ordinary single vision lens that focuses the image on the retina in the foveal region will focus the image behind the retina in the peripheral region. Therefore, to bring the image on the peripheral retina into focus, the present invention adds a relative plus power in the lens periphery.

A preferred embodiment of a lens element according to the invention provides an ophthalmic lens element having a peripheral zone that provides a positive refracting power (that is, "a plus power correction") relative to the refracting power of the central zone.

However, since positive refracting power is not accommodatable, it will induce blur on the fovea of the retina when the eye rotates to view objects in the periphery of the original field of view. To remedy this, an embodiment of the present invention provides a central zone that is sized and shaped to provide an optical correction that provides the wearer with clear foveal vision over an aperture that corresponds with the wearer's typical eye rotations. In other words, the central zone provides a first optical correction for correcting myopia associated with the foveal region of the wearer's eye, and has a shape and size that has been matched, or selected on the basis of, a wearer's typical head movement and eye movement characteristics of the wearer.

Therefore, the preferred embodiment provides a correct foveal correction, not just in the centre of the lens element, but also in the area representing the extent of typical eye rotations before the head rotation gets engaged.

The level of the plus power correction required by wearer will vary, given the large scatter in the myopic peripheral refractions found by Mutti et al. (2000). Thus, in a series embodiment of the present invention, a number of peripheral aspherisations are provided with the range of plus power corrections ranging from +0.50 to +2.00 D. For example, in one series embodiment, four different peripheral aspherisations are provided for each base curve: 0.5, 1.0, 1.50 and 2.0 D to be dispensed to people showing peripheral refractions up to the threshold value of the correction.

DESCRIPTION OF THE DRAWINGS

The present invention will now be described in relation to various examples illustrated in the accompanying drawings. However, it must be appreciated that the following description is not to limit the generality of the above description.

In the drawings:

FIG. 1-A is a front view of an ophthalmic lens element according to a first embodiment of the present invention FIG. 1-B is a sectional view of the ophthalmic lens element illustrated in FIG. 1-A.;

FIG. 2-A is a graph showing the front surface mean power of the lens element shown in FIG. 1-A;

FIG. 2-B is a graph showing the front surface astigmatism of the lens element shown in FIG. 1-A;

FIG. 2-C is a graph showing the tangential and sagittal surface power of the lens element shown in FIG. 1-A;

FIG. 3-A is a front view of an ophthalmic lens element according to a second embodiment of the present invention;

FIG. 3-B is a sectional view of an ophthalmic lens element illustrated in FIG. 3-A.;

FIG. 4-A is a graph showing the front surface mean power of the lens element shown in FIG. 3-A;

FIG. 4-B is a graph showing the front surface astigmatism of the lens element shown in FIG. 3-A;

FIG. 4-C is a graph showing the tangential and sagittal surface power of the lens element shown in FIG. 3-A;

FIG. 5-A is a front view of an ophthalmic lens element according to a third embodiment of the present invention;

FIG. 5-B is a sectional view of an ophthalmic lens element illustrated in FIG. 5-A.;

FIG. 6-A is a graph showing the front surface mean power of the lens element shown in FIG. 5-A;

FIG. 6-B is a graph showing the front surface astigmatism of the lens element shown in FIG. 5-A;

FIG. 6-C is a graph showing the tangential and sagittal surface power of the lens element shown in FIG. 5-A;

FIG. 7-A is a front view of an ophthalmic lens element according to a fourth embodiment of the present invention;

FIG. 7-B is a sectional view of an ophthalmic lens element illustrated in FIG. 5-A.;

FIG. 8-A is a graph showing the front surface mean power of the lens element shown in FIG. 7-A;

FIG. 8-B is a graph showing the front surface astigmatism of the lens element shown in FIG. 7-A;

FIG. 8-C is a graph showing the tangential and sagittal surface power of the lens element shown in FIG. 7-A;

FIG. 8-D is a series of contour plots for the ophthalmic lens element depicted in FIG. 7A;

FIG. 9-A is a front view of an ophthalmic lens element according to a fifth embodiment of the present invention;

FIG. 9-B is a sectional view of an ophthalmic lens element illustrated in FIG. 9-A;

FIG. 10-A is a graph showing the front surface mean power of the lens element shown in FIG. 9-A;

FIG. 10-B is a graph showing the front surface astigmatism of the lens element shown in FIG. 9-A;

FIG. 10-C is a graph showing the tangential and sagittal surface power of the lens element shown in FIG. 9-A;

DETAILED DESCRIPTION OF THE DRAWINGS

Example 1

Figure 11:
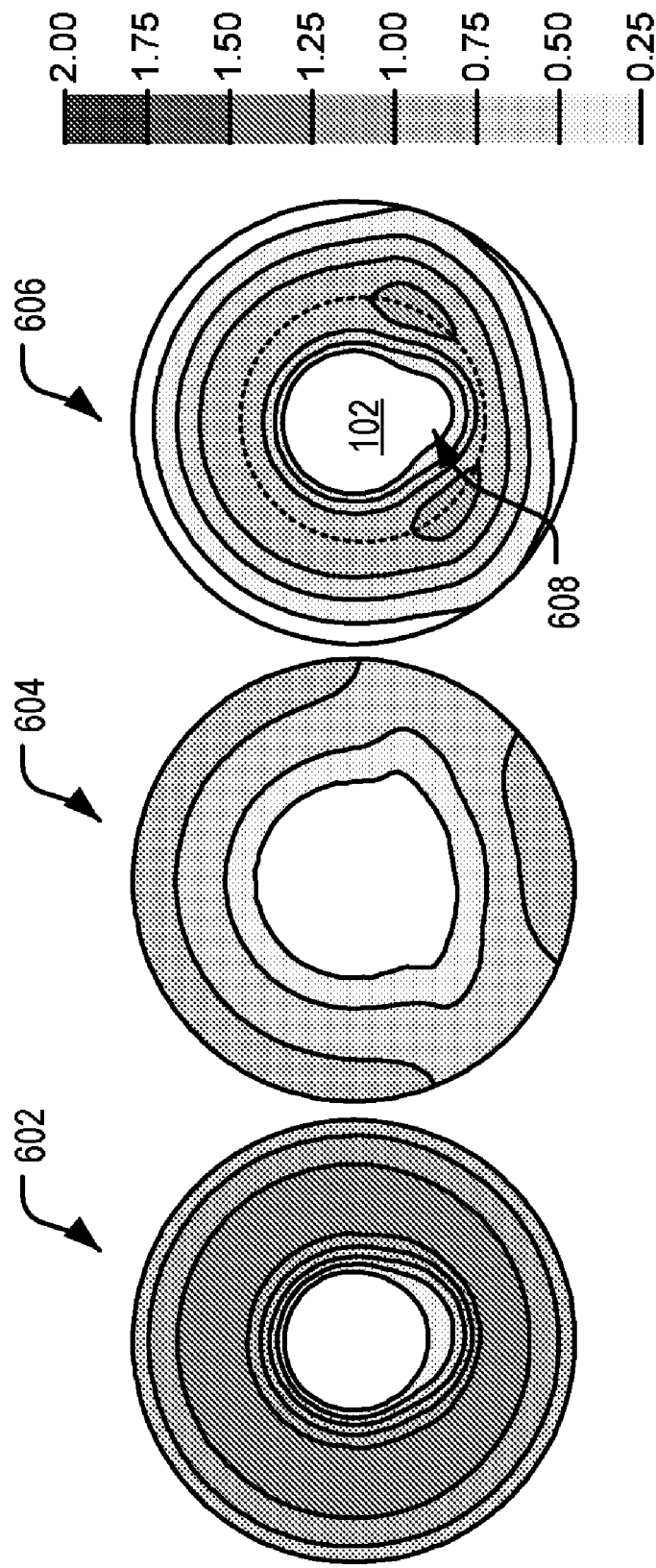
FIG. 11 is a series of contour plots for an embodiment of an ophthalmic lens element having an asymmetrical central zone.

FIG. 1-A illustrates an ophthalmic lens element 100 in accordance with an embodiment of the present invention having a central power of −3.00 D and a diameter of 60 mm. FIG. 1-B depicts a side view of the lens element 100 along section A-A', but is shown truncated to a diameter of 50 mm for fitting to a spectacle frame.

The depicted ophthalmic lens element 100 is an aspheric single vision lens 100 including a central zone 102 and a peripheral zone 104. As is shown in FIG. 1-B, the lens 100 also includes a front surface 108 and a back surface 110. In the illustrated example, the central zone 102 is a zone that is bounded by a 0.5 D contour or surface astigmatism. In the present case, the central zone 102 extends radially outwardly to an outer boundary located at a radius ($R_{P1}$) of about 11 mm.

In the central zone 102, the front surface 108 provides a central crown curvature of 3.00 D (in a lens material having a 1.53 index of refraction) that extends out to a radius ($R_C$) of about 5 mm. That radius corresponds to an eye rotation of around 10°. The front surface 108 also provides, in the peripheral zone 104, a marginal mean curvature of around 3.5 D at around a radius ($R_{P2}$) of 30 mm.

In this respect, where used throughout this specification, references to the term "marginal mean curvature" are to be understood as a reference to the curvature of the part of the peripheral zone that lies outside of the blended zone.

As is illustrated, the ophthalmic lens element 100 also includes a "blended zone" 106 (shown as shaded region), which is shown located in the peripheral zone 104 and which provides a gradual transition in refracting power from the refracting power at the outer boundary of the central zone 102 to an intermediate radius ($R_B$) in the peripheral zone 104. In the illustrated example, the blended zone is bounded by an inner 0.5 D contour of surface astigmatism at a radius ($R_{P1}$) of about 11 mm from the optical centre of the lens element 100, and an outer 0.5 D contour of surface astigmatism at a radius ($R_B$) of about 17 mm from the optical centre of the lens element 100.

Thus, in the illustrated example the blended zone has a radial extent of $R_B - R_{P1}$. As depicted in FIG. 1-A, the radial extent of the blended zone is less than the radius ($R_{P1}$) of the central zone 102.

In the example depicted in FIG. 1-A and FIG. 1-B, the front surface 108 of the ophthalmic lens element 100 has a shape that has been constructed by combining two ellipsoid surfaces of different curvature with a weighting function M(r) and is defined by the surface height function:

$$z_o(x,y) = M(r)g_o(\lambda) + (1 - M(r))g_1(\lambda)$$

where $$r = \sqrt{x^2 + y^2},$$

$$\lambda = \sqrt{(ax)^2 + (by)^2},$$

and $$M(r) = \frac{e^{-mr^2}}{1 + nr^p},$$

$$g_o(\lambda) = R_o - \sqrt{R_o^2 - \lambda^2},$$

$$g_1(\lambda) = R - \sqrt{R^2 - \lambda^2},$$

$$R = R_1(1 - tr),$$

with the parameters $R_o, R_1 > 0$, and a, b, m, n, p, t ≧ 0. If r=0, then M(r)=1 and $z_o = g_o(\lambda)$ which is an ellipsoidal surface with centre (0, 0, $R_o$) and semi-axes $$\frac{R_o}{a}, \frac{R_o}{b} \text{ and } R_o$$

in the x, y and z directions respectively. A similar argument can apply for large values of r. Here M(r)≈0 and hence $z_o \approx g_1(\lambda)$ a second ellipsoidal surface. For r values in between the M(r) function blends the two ellipsoidal surfaces together. M(r) can be any suitable weighting function.

In the present example, the shape of the lens surfaces is controlled by the following parameters:

$R_o$: The radius of curvature at the centre of the lens (hereinafter the "crown radius").

$R_1$: The radius of curvature towards the temporal edge of the lens (hereinafter the "marginal radius").

a, b: scaling factors for the x and y axes in $g_o$ and $g_1$. In this example, a=b=1 and thus a rotationally symmetric surface is defined from the blending of the two spheres $g_o$ and $g_1$ with radii of curvature $R_o$ and $R_1$ respectively. Alternatively, choosing a value for b<1 will result in a non-rotationally symmetric surface which is flatter in the y direction (ellipsoidal shaped surface).

m, n, p: parameters defining the function M(r) and where and how rapidly the transition between the central zone and peripheral zone occurs. Also the value of these parameters can be varied to locate an umbilic ring or band in the peripheral zone, or to control the size of the umbilic spherical region at the centre of the surface shape.

t: parameter to allow a gradual increase in the curvature of the peripheral zone as r increases.

The values of the parameters used for the above example are listed in table 1.

TABLE 1

| Parameter | Value |
| --- | --- |
| $R_0$ | 176.6 mm |
| $R_1$ | 161 mm |
| t | 0.001 |
| m | 0 |
| n | 0.0000003 |
| p | 5.5 |
| a | 1.0 |
| b | 1.0 |

FIG. 2-A to FIG. 2-C shows various characteristics of the front surface 108 of the lens 100 (ref. FIG. 1) having the parameters listed in table 1. The back surface of the lens is a sphere with surface power of −8.3 D in 1.53 index.

In this example, the ophthalmic lens element 100 provides a central zone 102 (ref. FIG. 1) having a refracting power of −5.0 D and a peripheral zone 104 (ref. FIG. 1) having a refracting power of around −4.5 D. In other words, the peripheral zone provides a plus power relative to the central zone.

Example 2

FIG. 3-A illustrates another example of an ophthalmic lens element 200 according to an embodiment of the present invention. In this example, the lens element 200 includes a front surface 108 having the same crown curvature as the lens 100 of Example 1, but a higher mean marginal curvature corresponding to an optical correction of +1.00 D in the peripheral zone relative to the central zone power. The back surface of this lens element 200 and the refracting power of the central zone 102 are the same as per Example 1.

The front surface 108 uses the same mathematical description as Example 1, with a few parameters changed as listed in table 2.

TABLE 2

| Parameter | Value |
| --- | --- |
| $R_0$ | 176.6 mm |
| $R_1$ | 139.5 mm |
| t | 0.001 |
| m | 0 |
| n | 0.0000003 |
| p | 5.5 |
| a | 1.0 |
| b | 1.0 |

FIG. 4-A to FIG. 4-C show various characteristics of the front surface 108 of the lens 200.

Example 3

FIG. 5-A illustrates an example of an ophthalmic lens element 300 in the 1.6 refractive index material including a front surface 108 having a marginal radius of curvature of 136.5 mm, and the same crown curvature as in Examples 1 and 2 corresponding to an optical correction of around +1.00 D in the peripheral zone 104 relative to the central zone 102 power. That is, in this example, the lens element 300 has a mean crown curvature of 3.40 D, and a mean marginal curvature of 4.39 D at a radius of 20 mm from the lens centre.

The front surface 108 uses the same mathematical description as Example 1 and Example 2 with a few parameters changed. The revised parameter values are as listed in table 3.

TABLE 3

| Parameter | Value |
| --- | --- |
| $R_0$ | 176.67 mm |
| $R_1$ | 136.5 mm |
| t | 0 |
| m | 0 |
| n | 0.0000028 |
| p | 2.5 |
| a | 1.0 |
| b | 1.0 |

FIG. 6-A to FIG. 6-C show various characteristics of the front surface 108 of the ophthalmic lens element 300.

As can be seen from the tangential and sagittal power profiles in FIG. 6-C (and is also shown approximately in FIG. 5-A), the ophthalmic lens element 300 has a larger blended region 106, as compared with ophthalmic lens element 100 (ref. FIG. 1A) and ophthalmic lens element 200 (ref. FIG. 3A).

As depicted in FIG. 6B, a larger blended region 106 helps to keep the peak value of astigmatism on the front surface 108 to around 0.75 D as compared to over 2.00 D in Example 2. It is envisaged that a lower peak value of astigmatism will make the ophthalmic lens element 300 easier for the wearer to adapt to.

Example 4

FIG. 7-A illustrates another example of an ophthalmic lens element 400 according to an embodiment of the present invention. In this example the ophthalmic lens element 400 is manufactured from a 1.6 refractive index material and includes a front surface 108 having the same crown radius as the lens element 300 of Example 3, and a similar marginal curvature in the peripheral zone, corresponding to an optical correction of around +1.00 D in the peripheral zone 104 power relative to the central zone 102 power.

The lens element 400 has a mean crown curvature of 3.40 D, and a mean marginal curvature of 4.28 D at a radius of 20 mm.

In this example, unlike the previous examples, the front surface 108 uses a finite element mesh surface mathematical description and has been designed by blending a central spherical surface having a surface power of 3.40 D with a peripheral spherical surface having a surface power of 4.28 D at a radius of 20 mm from the lens centre.

The blending occurs between the radii of 11 mm and 50 mm.

In the present case, a C2 continuous extrapolation algorithm, that minimises the surface curvature deviation from that of the marginal curvature, has been used to calculate a surface profile of the blend. It will be appreciated that it is not essential that a C2 extrapolation algorithm be used as any other suitable extrapolation algorithm may also be suitable.

FIG. 8-A to FIG. 8-C show various characteristics of the front surface 108 of the lens element 300. As can be seen from the tangential and sagittal power profiles depicted in FIG. 8-C, the ophthalmic lens element 400 has a larger and nearly perfect spherical central region as compared to the previous examples. In this example, the larger and nearly perfect spherical central region helps to provide a clearer foveal vision to the wearer up to moderate values of eye rotation.

FIG. 8-D illustrates contour plots 402, 404, 406 for the surface tangential 402, and sagittal powers 404 as well as the surface astigmatism 406 (cylinder) of the front surface of the ophthalmic lens element 400.

Example 5

FIG. 9-A illustrates an example of a segmented bifocal ophthalmic lens 500 element in 1.6 refractive index material including a front surface 108 having a crown curvature of 3.96 D, and a peripheral marginal curvature of 5.46 D at a radius of 20 mm from the lens centre, corresponding to an optical correction of +1.50 D in the peripheral zone 104 relative to the central zone 102.

In this example, the front surface 108 is made up of two rotationally symmetric spherical segments, namely a first centred round segment defining the central zone 102 and a second centred segment defining the peripheral zone 104.

In the present case, the first centred round segment has a radius ($R_{P1}$) of 14 mm which provides clear foveal vision up to the eye rotations of around 30°. It is to be appreciated that a different radius may be used without departing from the scope of the invention.

FIG. 10-A to FIG. 10-C show various characteristics of the front surface 108 of the ophthalmic lens element 500.

As shown in FIG. 10-B, the second centred segment has zero surface astigmatism and in addition to providing an appropriate correction for peripheral vision, could also be used foveally for close work, such as reading.

Example 6

FIG. 11 illustrates contour plot diagrams 602 (tangential), 604 (sagittal), 606 (cylinder) of an example of an ophthalmic lens element including a central zone 102 having an asymmetric shape.

The contour plots 602, 604, 606, illustrate the surface tangential and sagittal powers as well as surface astigmatism (cylinder) of the front surface of an ophthalmic lens element in 1.6 refractive index material.

In the present case, the surface characterised by the contour plots 602, 604, 606 have be derived as a new optimisation for the original surface characterised by the contour plots 402, 404, 406 (ref. FIG. 8-D) of the front surface of the ophthalmic lens element 400 with the symmetrical central zone 102 of Example 4.

In this example, however, and as is depicted in contour plot 606, the central zone 102 is asymmetrical and provides a low level of astigmatism in an area 608 elongated towards the lower nasal side of the ophthalmic lens element to reduce the need for turning the head down during near work. As a result, the mean surface power in the peripheral zone, at different radii from the optical centre of the lens element (as measured on the front surface of the lens), may not be constant throughout a particular radius. However, the peripheral power at 20 mm from the optical centre of the lens element will be at least +0.50 D relative to the surface power at the optical centre of the central zone and inscribes, over each radii, the peripheral zone over an azimuthal extent of at least 270 degrees.

Figure 12:
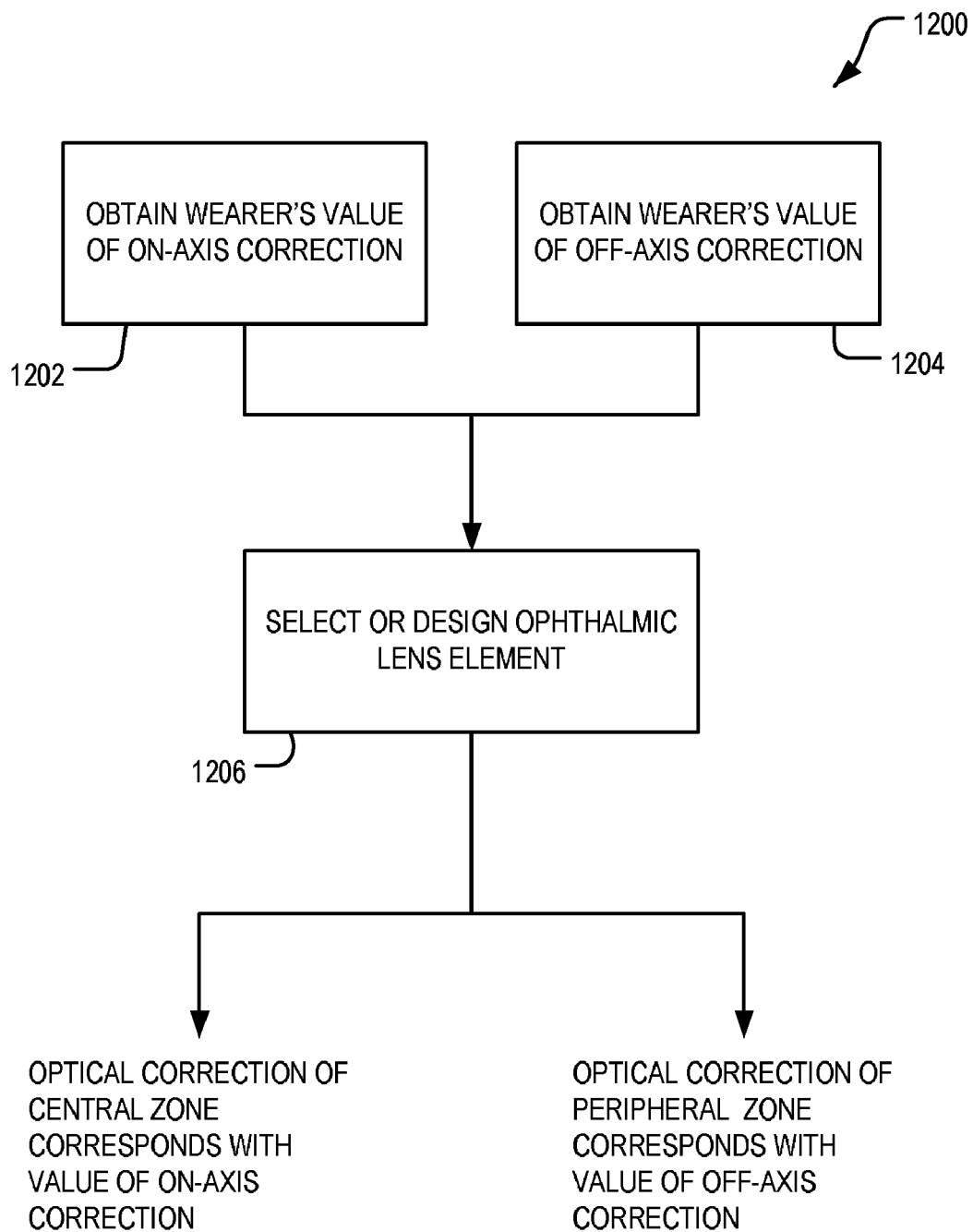
FIG. 12 is a simplified flow diagram of a method embodiment of the present invention.

FIG. 12 is a simplified flow diagram for a method embodiment of the present invention. As shown, an embodiment of the method includes the step 1202 of obtaining a wearer's on-axis optical correction value. As explained previously, an on-axis optical correction value is a value required for clear central vision. The on-axis optical correction may be obtained using conventional measurement techniques and devices that known in the art, such as At step 1204, the wearer's off-axis optical correction value, or values, are obtained. As explained previously, an off-axis optical correction value is an optical correction required to correct peripheral refractive errors in the wearer's eye, and thus for correcting myopia or hyperopia associated with a peripheral region of the retina of the wearer's eye.

The off-axis optical correction may be obtained using conventional measurement techniques and devices known in the art, such as a Shin-Nippon autorefractor configured to measure peripheral refraction in a wearer's eye for a measurement axis aligned with a direction different to that of the wearer's primary direction of gaze. One suitable technique is described in David A. Atchison et al, 'Peripheral Refraction along the Horizontal and Vertical Visual Fields in Myopia' (2006) 46 *Vision Research* 1450, the entire disclosures of which is incorporated herein by reference solely for the purpose of providing a skilled reader with an example a suitable device.

At step 1206, an ophthalmic lens element is selected or designed in accordance with the measured values so as to include a central zone providing an optical correction corresponding with the on-axis correction; and a peripheral zone surrounding the central zone, the peripheral zone providing an optical correction corresponding with the off-axis correction. As explained previously, in addition to providing a desired optical correction in the central and peripheral zones, those zones may also have a shape and size that depends on the wearer's typical pattern of eye rotation.

The selection or designing of the ophthalmic lens element may be performed by a system including a programmed computer equipped with suitable computer software. One example of such a system 1300 is depicted in FIG. 13.

Figure 13:
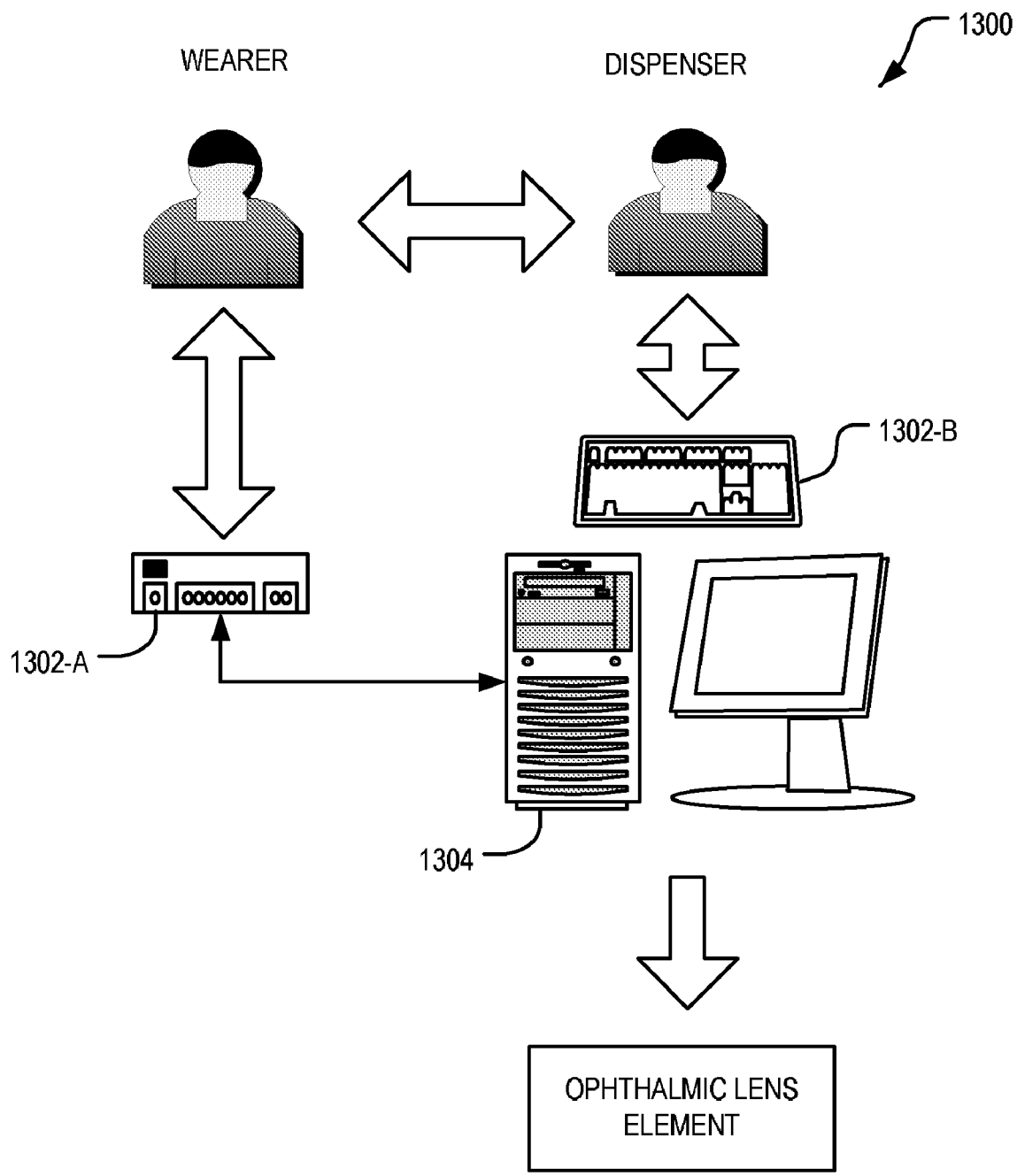
FIG. 13 is a simplified block diagram of a system embodiment of the present invention.

As illustrated in FIG. 13, the system 1300 includes one or more input devices 1302-A, 1302A for accepting or obtaining optical correction values for a wearer. The optical correction values include a required value of on-axis optical correction for correcting myopia associated with the foveal region of the wearer's eye, and a required value of off-axis optical correction for correcting myopia or hyperopia associated with a peripheral region of the retina of the wearer's eye.

The input devices 1302-A, 1302-B will typically include conventional devices for measuring the wearer's required on-axis optical correction and the wearer's a device required off-axis optical correction. One suitable input device for measuring a wearer's required off-axis optical correction is a Hartmann-Shack instrument configured to measure peripheral wave front aberrations in a wearer's eye for a measurement axis aligned with the direction of the wearer's preferred retinal location. Another suitable device is an open-field autorefractor, such as, for example, an autorefractor sold under the brand Shin-Nippon SRW-5000 or Shin Nippon NVision K5001.

The system 1300 also includes a processor 1304 for accepting and processing the wearer's optical correction values to select or design an ophthalmic lens element according to the required values of on-axis and off-axis correction. In the illustrated example, the processor 1304 is a programmed computer equipped with suitable computer software. Examples of suitable computers include a desktop computer, a hand-held computer, a lap top computer, or a personal digital assistant.

Where the ophthalmic lens element is to include a central zone having a shape and size that is matched to the wearer's typical pattern of eye rotation, the input devices 1302-A, 1302-B may further include a device for accepting or obtaining head movement and eye movement characteristics for the wearer, such as, for example, an eye-tracking system of the type described in U.S. Pat. No. 6,827,443, the entire disclosures of which is incorporated herein by reference. In such a case, the processor 1304 will also include additional functionality to modify the size and shape of the central zone according to the head movement and eye movement characteristics of the wearer so that central zone provides an area of substantially uniform refracting power for supporting central vision throughout an angular range of eye rotations.

The above examples describe the use of specific parameters and specific surface geometries. However, it is to be appreciated that the invention is not to be so limited. The applicant envisages that other surface geometries and other parameters may also be used to design or dispense a lens element according to the present invention. By way of non-limiting examples, such other parameters may include:

Chromatic aberration: for example, since the periphery of the fovea has relatively fewer cones and more rods it may be more important to keep a particular wavelength in focus, thus the design of the lens element may take into account parameters that provide selective focussing of that wavelength. It may also be necessary to have low chromatic aberration materials.

Sagittal (S) vs tangential (T) power error: for example, it may prove necessary to maintain quite radically different S v T optimisation weights.

Clinical measures to lens relationship: for example, it is anticipated a wave-front abberometer may be used to sample optical errors from a foveal through to a peripheral location to more fully characterise the off-axis errors of the eye. Once the wavefront aberrations have been characterised, the desired blur spot minimisation is applied to deliver appropriate corrections to the entire field of view of the eye. Those samples may be translated, using appropriate relationships, so as to characterise the shape and or off-axis correction/s of the eye.

Finally, it will be understood that there may be other variations and modifications to the configurations described herein that are also within the scope of the present invention.

The invention claimed is:
1. An ophthalmic lens element for correcting myopia in a wearer's eye, the ophthalmic lens element having a front surface, an optical axis, and an optical centre, the ophthalmic lens element including:
  (a) a central zone providing a first optical correction for substantially correcting myopia associated with the foveal region of the wearer's eye, the central zone comprising an area for supporting central vision over an angular range of eye rotation about the optical axis; and
  (b) a peripheral zone surrounding the central zone, the peripheral zone providing a second optical correction for substantially correcting myopia or hyperopia associated with a peripheral region of the retina of the wearer's eye;
    wherein the mean surface power of the peripheral zone at a radius of 20 mm from the optical centre as measured on the front surface is at least +0.50 D relative to the surface power at the optical centre over an azimuthal extent of at least 270 degrees.

2. An ophthalmic lens element according to claim 1, wherein the ophthalmic lens element comprises a spectacle lens, wherein the first optical correction is specified as a first refracting power and the second optical correction is specified as a second refracting power, and wherein the second refracting power provides a plus power correction relative to the first refracting power.

3. An ophthalmic lens element according to claim 2 wherein the first refracting power is located at the optical centre of the ophthalmic lens element.

4. An ophthalmic lens element according to claim 2 wherein the mean value of the second refracting power is a mean refracting power at a radius of 20 mm from the optical centre, as measured on the front surface of the lens element, and inscribes the peripheral zone over an azimuthal extent of at least 270 degrees.

5. An ophthalmic lens element according to claim 2 wherein the second refracting power is in the range of +0.50 D to +2.0 D relative to the first refracting power.

6. An ophthalmic lens element according to claim 2, wherein the refracting power in the central zone is in the range from plano to −6.00 D.

7. An ophthalmic lens element according to claim 6, wherein the refracting power in the central zone is in the range from plano to −4.00 D.

8. An ophthalmic lens element according to claim 2, wherein, within the central zone, the surface power of the front surface varies by less than 0.5 D.

9. An ophthalmic lens element according claim 8, wherein the mean refracting power of the peripheral zone is in the range of +0.50 D to +2.0 D relative to the refracting power at the optical centre.

10. An ophthalmic lens element according to claim 8, wherein the mean refracting power of the peripheral zone at a radius of 20 mm from the optical centre as measured on the front surface of the lens, is at least +0.50 D relative to the refracting power at the optical centre and inscribes the peripheral zone over an azimuthal extent of at least 270 degrees.

11. An ophthalmic lens element according to claim 8, wherein the mean refracting power of the peripheral zone at a radius of 20 mm from the optical centre as measured on the front surface of the lens, is at least +1.00 D relative to the refracting power at the optical centre and inscribes the peripheral zone over an azimuthal extent of at least 270 degrees.

12. An ophthalmic lens element according to claim 8, wherein the mean refracting power of the peripheral zone at a radius of 20 mm from the optical centre as measured on the front surface of the lens, is at least +1.50 D relative to the refracting power at the optical centre and inscribes the peripheral zone over an azimuthal extent of at least 270 degrees.

13. An ophthalmic lens element according to claim 8 wherein the mean refracting power of the peripheral zone at a radius of 20 mm from the optical centre as measured on the front surface of the lens, is at least +2.00 D relative to the refracting power at the optical centre and inscribes the peripheral zone over an azimuthal extent of at least 270 degrees.

14. An ophthalmic lens element according to claim 1, wherein the central zone is a zone bounded by a 0.5 D contour of front surface astigmatism.

15. An ophthalmic lens element according to claim 1, wherein the central zone is a zone bounded by a stepped increase in the front surface mean curvature of at least +0.5 D.

16. An ophthalmic lens element according to claim 1, wherein the central zone is a zone bounded by a stepped increase in the front surface mean curvature of at least +1.0 D.

17. An ophthalmic lens element according to claim 1, wherein the central zone is a zone bounded by a stepped increase in the front surface mean curvature of at least +1.5 D.

18. An ophthalmic lens element according to claim 1, wherein the central zone is a zone bounded by a stepped increase in the front surface mean curvature of at least +2.0 D.

19. An ophthalmic lens element according claim 1, wherein within the central zone, the surface power of the front surface varies by less than 0.5 D, and wherein the mean surface power of the peripheral zone at a radius of 20 mm from the optical centre as measured on the front surface of the lens, is at least +1.00 D relative to the surface power at the optical centre and inscribes the peripheral zone over an azimuthal extent of at least 270 degrees.

20. An ophthalmic lens element according to claim 19 wherein the ophthalmic lens element comprises a semifinished spectacle lens blank or a spectacle lens wafer.

21. An ophthalmic lens element according claim 1, wherein within the central zone, the surface power of the front surface varies by less than 0.5 D, and wherein the mean surface power of the peripheral zone at a radius of 20 mm from the optical centre as measured on the front surface of the lens, is at least +1.50 D relative to the surface power at the optical centre and inscribes the peripheral zone over an azimuthal extent of at least 270 degrees.

22. An ophthalmic lens element according to claim 21 wherein the ophthalmic lens element comprises a semifinished spectacle lens blank or a spectacle lens wafer.

23. An ophthalmic lens element according claim 1, wherein within the central zone, the surface power of the front surface varies by less than 0.5 D, and wherein the mean surface power of the peripheral zone at a radius of 20 mm from the optical centre as measured on the front surface of the lens, is at least +2.00 D relative to the surface power at the optical centre and inscribes the peripheral zone over an azimuthal extent of at least 270 degrees.

24. An ophthalmic lens element according to claim 23 wherein the ophthalmic lens element comprises a semifinished spectacle lens blank or a spectacle lens wafer.

25. An ophthalmic lens element according to claim 1, wherein the peripheral zone includes a blended zone that extends radially outwards from the boundary of the central zone and into the peripheral zone, and wherein the radial extent of the blended zone, within a 40 mm diameter lens element is less than the radius of the central zone for clear foveal vision.

26. A lens element according to claim 1, wherein the central zone is shaped and sized according to a typical range of eye-rotations of the wearer for central vision.

27. A lens element according to claim 26, wherein the central zone is a circular aperture having a diameter corresponding with the extent of wearer's typical eye rotations before they engage head rotation.

28. A lens element according to claim 26 where the central zone has a rotationally symmetrical shape.

29. A lens element according to claim 26 where the central zone has an asymmetrical shape to allow for the asymmetrical distribution of the frequency of eye rotations.

30. An ophthalmic lens element according to claim 1, wherein, within the central zone, the surface power of the front surface varies by less than 0.5 D.

31. An ophthalmic lens element for correcting myopia in a wearer's eye, the ophthalmic lens element comprising a spectacle lens having a front surface, an optical axis, and an optical centre, the ophthalmic lens element including:
   (a) a central zone providing a first optical correction for substantially correcting myopia associated with the foveal region of the wearer's eye, the central zone comprising an area supporting central vision over an angular range of eye rotation about the optical axis; and
   (b) a peripheral zone surrounding the central zone, the peripheral zone providing a second optical correction for substantially correcting myopia or hyperopia associated with a peripheral region of the retina of the wearer's eye; wherein the first optical correction is specified as a first refracting power and the second optical correction is specified as a second refracting power, and wherein the second refracting power provides a plus power correction relative to the first refracting power, and wherein the refracting power in the central zone is in the range from plano to −6.00 D.

32. A method of dispensing or designing an ophthalmic lens element for correcting myopia in a wearer's eye, the ophthalmic lens element having a front surface, an optical axis and an optical centre, the method including:
   (a) obtaining, for the wearer:
      (i) a required value of on-axis optical correction, the on-axis optical correction for correcting myopia associated with the foveal region of the wearer's eye; and
      (ii) a required value of off-axis optical correction, the off-axis optical correction for correcting myopia or hyperopia associated with a peripheral region of the retina of the wearer's eye;
   (b) selecting or designing the ophthalmic lens element according to the values of on-axis and off-axis correction, the ophthalmic lens element including:
      (i) a central zone providing an optical correction corresponding with the on-axis optical correction, the central zone comprising an area for supporting central vision over an angular range of eye rotation about the optical axis; and
      (ii) a peripheral zone surrounding the central zone, the peripheral zone providing an optical correction corresponding with the off-axis optical correction, wherein the mean surface power of the peripheral zone at a radius of 20 mm from the optical centre as measured on the front surface is at least +0.50 D relative to the surface power at the optical centre over an azimuthal extent of at least 270 degrees.

33. A method according to claim 32, further including:
   (c) determining the head movement and eye movement characteristics of the wearer; and
   (d) sizing and shaping the central zone according to the head movement and eye movement characteristics of the wearer so the central zone provides an area of substantially uniform refracting power for supporting central vision throughout the angular range of eye rotations.

34. A system for dispensing or designing an ophthalmic lens element for correcting myopia in a wearer's eye, the ophthalmic lens element having a front surface, an optical axis and an optical centre, the system including:
   (a) an input device for accepting or obtaining optical correction values for a wearer, the optical correction values including:
      (i) a required value of on-axis optical correction, the on-axis optical correction for correcting myopia associated with the foveal region of the wearer's eye; and
      (ii) a required value of off-axis optical correction, the off-axis optical correction for correcting myopia or hyperopia associated with a peripheral region of the retina of the wearer's eye; and
   (b) a processor for processing the wearer's optical correction values to select or design an ophthalmic lens element according to the values of on-axis and off-axis correction, the ophthalmic lens element including:
      (i) a central zone providing an optical correction corresponding with the on-axis correction, the central zone comprising an area for supporting central vision over an angular range of eye rotation about the optical axis; and
      (ii) a peripheral zone surrounding the central zone, the peripheral zone providing an optical correction corresponding with the off-axis correction, wherein the mean surface power of the peripheral zone at a radius of 20 mm from the optical centre as measured on the front surface is at least +0.50 D relative to the surface power at the optical centre over an azimuthal extent of at least 270 degrees.

35. A system according to claim 34, further including:
   (a) input device for accepting or obtaining head movement and eye movement characteristics for the wearer; and
   (b) the processor for modifying the size and shape of the central zone according to the head movement and eye movement characteristics of the wearer so that central zone provides an area of substantially uniform refracting power for supporting central vision throughout the angular range of eye rotations.

36. A method of reducing myopia progression in a myope, the method including providing, to a myope, spectacles bearing a pair of ophthalmic lens elements, each lens element for a respective eye, each lens element having a front surface, an optical axis, and an optical centre, each ophthalmic lens element including:
   (a) a central zone providing an optical correction corresponding with on-axis correction for correcting myopia associated with the foveal region of a respective eye, the central zone comprising an area supporting central vision over an angular range of eye rotation about the optical axis; and
   (b) a peripheral zone surrounding the central zone, the peripheral zone providing an optical correction for correcting myopia or hyperopia associated with the peripheral region of a respective eye, wherein the mean surface power of the peripheral zone at a radius of 20 mm from the optical centre as measured on the front surface is at least +0.50 D relative to the surface power at the optical centre over an azimuthal extent of at least 270 degrees.

37. An ophthalmic lens element for correcting myopia in a wearer's eye, the ophthalmic lens element comprising a spectacle lens having a front surface, an optical axis, and an optical centre, the lens element including:

(a) a central zone providing a first optical correction for substantially correcting myopia associated with the foveal region of the wearer's eye, the first optical correction specified as a first refracting power; and (b) a peripheral zone surrounding the central zone, the peripheral zone providing a second optical correction for substantially correcting myopia or hyperopia associated with a peripheral region of the retina of the wearer's eye, the second optical correction specified as a second refracting power;

wherein the second refracting power provides a plus power correction relative to the first refracting power, wherein the central zone is sized and shaped to provide the first optical correction over a range of eye-rotations to support central vision throughout an angular range of eye rotations about the optical axis, and wherein the mean surface power of the peripheral zone at a radius of 20 mm from the optical centre as measured on the front surface is at least +0.50 D relative to the surface power at the optical centre over an azimuthal extent of at least 270 degrees.

38. The use of an ophthalmic lens element to correct myopia in a wearer's eye, the ophthalmic lens element comprising a spectacle lens having a front surface, an optical axis, and an optical centre, the lens element including:

(a) a central zone providing a first optical correction for substantially correcting myopia associated with the foveal region of the wearer's eye, the first optical correction specified as a first refracting power; and (b) a peripheral zone surrounding the central zone, the peripheral zone providing a second optical correction for substantially correcting myopia or hyperopia associated with a peripheral region of the retina of the wearer's eye, the second optical correction specified as a second refracting power;

wherein the second refracting power provides a plus power correction relative to the first refracting power, wherein the central zone is sized and shaped to provide the first optical correction over a range of eye-rotations about the optical axis to support central vision throughout that range, and wherein the mean surface power of the peripheral zone at a radius of 20 mm from the optical centre as measured on the front surface is at least +0.50 D relative to the surface power at the optical centre over an azimuthal extent of at least 270 degrees.

39. An ophthalmic lens element for correcting or retarding myopia progression in a wearer's eye, the ophthalmic lens element having a front surface, an optical axis, and an optical centre, the lens element including:

(a) a central zone comprising an area for supporting central vision over an angular range of eye rotation about the optical axis; and (b) a peripheral zone surrounding the central zone, the peripheral zone providing, relative to the central zone, a plus power optical correction for substantially correcting myopia or hyperopia associated with a peripheral region of the retina of the wearer's eye, wherein the mean surface power of the peripheral zone at a radius of 20 mm from the optical centre as measured on the front surface is at least +0.50 D relative to the surface power at the optical centre over an azimuthal extent of at least 270 degrees.

40. The use of an ophthalmic lens element to correct or retard myopia progression, the ophthalmic lens element having a front surface, an optical axis and an optical centre, the ophthalmic lens element including:

(a) a central zone comprising an area for supporting central vision over an angular range of eye rotation about the optical axis; and (b) a peripheral zone surrounding the central zone, the peripheral zone providing, relative to the central zone, a plus power optical correction for substantially correcting myopia or hyperopia associated with a peripheral region of the retina of the wearer's eye, wherein the mean surface power of the peripheral zone at a radius of 20 mm from the optical centre as measured on the front surface is at least +0.50 D relative to the surface power at the optical centre over an azimuthal extent of at least 270 degrees.

* * * * *